July 26, 1932.  R. P. VALTIER  1,868,780
ESCALATOR
Filed June 25, 1930
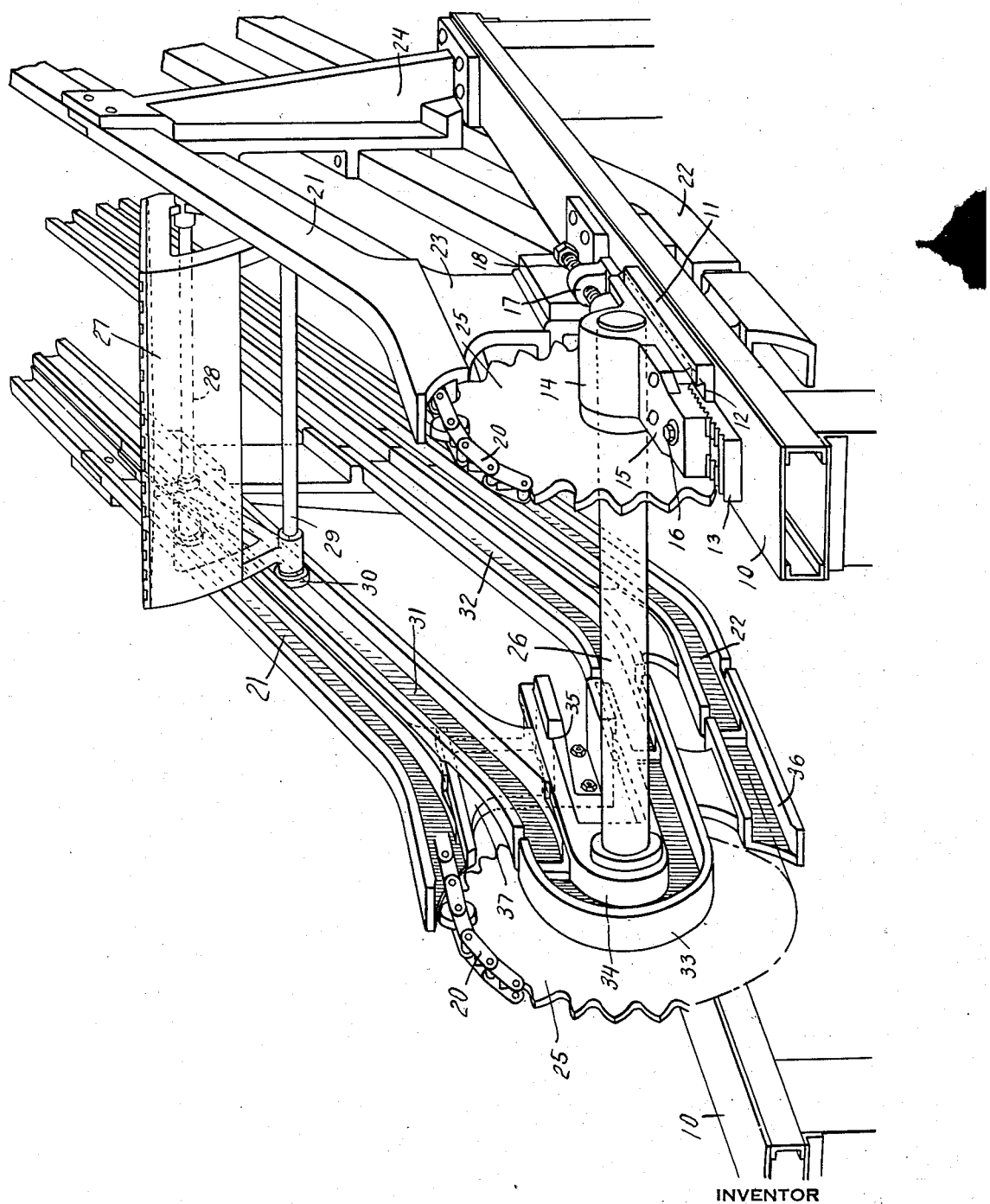
INVENTOR
Ralph P. Valtier
BY
Marshall & Hawley
ATTORNEYS

Patented July 26, 1932

1,868,780

UNITED STATES PATENT OFFICE

RALPH P. VALTIER, OF NEW YORK, N. Y., ASSIGNOR TO HAROLD W. SHONNARD, OF MONTCLAIR, NEW JERSEY

ESCALATOR

Application filed June 25, 1930. Serial No. 463,672.

This invention relates to escalators and its object is to improve upon structures of this kind.

More specifically, its object is to provide a simple and efficient arrangement for adjusting the length of the track for the purpose of obtaining the desired tension of the step operating chains.

This and other objects of the invention will appear from the following specification.

The drawing is a perspective view of the lower end of a passenger carrying escalator, with certain of the parts omitted for the sake of clearness. It is understood that the upper end of the tracks are constructed to provide an endless support for the step or carriage.

In the drawing, 10, 10 designate the supporting structure of the lower end of the apparatus. To these are affixed bed plates 11 which are constructed to form dovetail tracks 12 and a serrated adjustment plate 13. The journal box 14 is slidably supported in the dovetail tracks 12 and a locking member 15 which, as shown, is affixed to the journal box, is provided on its lower surface with teeth which are adapted to fit into the locking plate 13. 16 is a bolt arranged to hold the member 15 in engagement with the locking plate 13. One end of the bed plate 11 is constructed to form a lug 17 through which passes, in threaded engagement therewith, an adjusting screw 18 which is arranged to adjust the position of the journal box in the bed plate 11. At the time of adjustment the member 15 is detached from the journal box and the bolt 16 slackened for the purpose of permitting the desired relative movement between the journal box and the bed 11.

20, 20 are the step operating chains which, in accordance with former practice, are supported in upper guide rails 21 and lower guide rails 22, which in turn are supported by pedestals 23, 24 affixed to the base 10. The chains run around sprocket wheels 25, 25 which are affixed to a supporting shaft 26, the ends of which are rotatably supported in the journal boxes 14.

One of the steps is shown designated by the numeral 27. This, in accordance with former practice, is supported on two transverse rods 28, 29, on the ends of both of which are rollers, those on the upper cross rod 28 running in the guides 21 during the movement of the step in one direction and in the lower guides 22 during the return movement. The sprocket chains 20, 20 are connected to the upper cross rod 28.

The rollers on the lower cross rod 29 are designated by 30 (one only being shown in the drawing). These run in tracks 31 during the movement of the step in one direction and in tracks 32 during the return movement of the step. According to this invention the rollers 30 as they pass from one of the tracks 31 to the other track 32 or vice versa, are guided in a U-shaped member 33.

This is freely mounted on the supporting shaft 26. This member comprises a semicircular guide portion 34, the upper part of which is in alinement with the lower end of track 31, the lower end of which is curved to run into planes which are tangential to the upper and lower surfaces of the semi-circular guide portion 34. The lower end of the guide portion 34 runs off into a horizontal track which extends under and beyond the supporting shaft 26 and into alinement with the upper and lower surfaces of the guide track 32 which are also horizontal.

It may be seen that the lower surface of the upper portion of the guide portion 34 is extended horizontally beyond the lower end of the upper guide rail 31 and this extension is supported and guided in a track 35. Where the guide portion 34 overlaps the lower end of the under surface of guide rail 31, the adjacent parts are cut away to overlap each other, so that they may be moved relatively without disturbing the continuity of the surface over which the rollers 30 pass. Similarly, the lower part of the guide portion 34 and the under surface of the lower track 32, where they overlap, are cut away to provide for relative movement without disturbing the continuity of the bearing surface.

The movable member 33 also comprises a channel-shaped bracket 36 which forms a continuation of the guide rail 22, the lower portions of both the bracket and the rail overlapping and forming an unbroken bearing surface. Another bracket 37 forms an overlapping continuation of the lower part of the guide rail 21.

By means of such an arrangement as that which has been described, the supporting shaft 26 may be moved transversely in order to adjust the length of the tracks and the tension of the chains 20, 20. This adjustment can be made easily and quickly and the parts are so arranged that they take up no extra space. By means of such an arrangement the necessity of idler wheels and tension weights is obviated.

It is obvious that variations and modifications in structure may be made without departing from the spirit of the invention, and I intend no limitations other than those imposed by the following claims.

What I claim is:

1. In combination with an escalator having a movable carriage, spaced supporting members at each end of the carriage, a pair of outer guide rails on each side of the carriage for the outer supporting members, chains connected with said outer supporting members, sprocket wheels interconnecting said outer guide rails, and adjustable bearings for the sprocket wheels, said bearings being positively retained in adjusted position.

2. In combination with an escalator having a movable carriage, spaced supporting members at each end of the carriage, a pair of outer guide rails on each side of the carriage for the outer supporting members, chains connected with said outer supporting members, sprocket wheels interconnecting said outer guide rails, movable bearings for the sprocket wheels, and brackets movable with said bearings interposed between the sprocket wheels and the ends of the outer guide rails.

3. In combination with an escalator having a movable carriage, spaced supporting members at each end of the carriage, a pair of outer guide rails on each side of the carriage for the outer supporting members, chains connected with said outer supporting members, sprocket wheels interconnecting said outer guide rails, movable bearings for the sprocket wheels, and brackets movable with said bearings interposed between the sprocket wheels and the ends of the outer guide rails, said brackets overlapping the ends of said guide rails and arranged to form unbroken continuations of the bearing surfaces thereof.

4. In combination with an escalator having a movable carriage, spaced supporting members at each end of the carriage, a pair of outer guide rails on each side of the carriage for the outer supporting members, a pair of inner guide rails on each side of the carriage for the inner supporting members, chains connected with said outer supporting member, sprocket wheels interconnecting said outer rails, movable bearings for the sprocket wheels, and channel-shaped arcuate members movable with said bearings interconnecting the inner guide rails, said bearings and arcuate members being positively retained in adjusted position.

5. In combination with an escalator having a movable carriage, spaced supporting members at each end of the carriage, a pair of outer guide rails on each side of the carriage for the outer supporting members, a pair of inner guide rails on each side of the carriage for the inner supporting members, chains connected with said outer supporting members, sprocket wheels interconnecting said outer rails, movable bearings for the sprocket wheels, channel-shaped arcuate members movable with said bearings interconnecting the inner guide rails, and members movable with said bearings having arcuate portions interconnecting the inner guide rails and brackets interposed between the outer guide rails and the sprocket wheels.

6. In combination with an escalator having a movable carriage, spaced supporting members at each end of the carriage, a pair of outer guide rails on each side of the carriage for the outer supporting members, a pair of inner guide rails on each side of the carriage for the inner supporting members, chains connected with said outer supporting member, sprocket wheels interconnecting said outer rails, movable bearings for the sprocket wheels, channel-shaped arcuate members movable with said bearings interconnecting the inner guide rails, members movable with said bearings having arcuate portions with extended flanges interconnecting the inner guide rails, said flanges overlapping said inner guide rails and forming therewith continuous bearing surfaces for the inner supporting members, and brackets extending from said members between the outer guide rails and the sprocket wheels overlapping said outer guide rails and arranged to form unbroken continuations of the bearing surfaces thereof for the outer supporting members.

7. A guide-way for an escalator consisting of an inclined portion, a movable end portion in the form of an arcuate channel having a central bearing and an extension from said bearing, said inclined portion having a seat on said extension, and a slidable support under said extension.

8. In combination, a movable step, a rotatable shaft to move same having movable bearings, a guide for said step consisting of upper and lower inclined portions, an arcuate end portion on said shaft, an extension from said bearing forming a seat for said upper inclined portion and over-lapping same to maintain a continuous bearing surface for said step, said arcuate member over-lapping said lower inclined portion to maintain a continuous bearing surface for said step, and means for moving said shaft and its bearings together with said arcuate member and extension as a unit.

9. In combination, a movable step having inner and outer wheels, overlapping stationary and movable tracks for said wheels, sprockets interconnecting the guides for the outer wheels, bearings for said sprockets, and supports for the ends of the stationary tracks, said bearings, movable tracks and supports being movable as a unit in relation to said stationary tracks.

10. In combination, a movable step having inner and outer wheels, stationary tracks for said wheels having curved ends, sprockets interconnecting the guides for the outer wheels, bearings for said sprockets, arcuate tracks on said shaft, and straight supports overlapping the curved ends of the stationary tracks, said bearings, arcuate tracks and supports being movable as a unit in relation to said stationary tracks.

RALPH P. VALTIER.